United States Patent
Imada et al.

(10) Patent No.: US 9,441,107 B2
(45) Date of Patent: Sep. 13, 2016

(54) SHAPED PRODUCT SUPPRESSED IN BLEEDING AND PRODUCTION PROCESS THEREFOR

(71) Applicant: Nippon Valqua Industries, Ltd., Tokyo (JP)

(72) Inventors: Hirohisa Imada, Nara (JP); Tomoaki Yokota, Nara (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 14/424,278

(22) PCT Filed: Aug. 22, 2013

(86) PCT No.: PCT/JP2013/072352
§ 371 (c)(1),
(2) Date: Feb. 26, 2015

(87) PCT Pub. No.: WO2014/034508
PCT Pub. Date: Mar. 6, 2014

(65) Prior Publication Data
US 2015/0240075 A1 Aug. 27, 2015

(30) Foreign Application Priority Data

Aug. 27, 2012 (JP) ................................. 2012-186378

(51) Int. Cl.
*C08L 71/00* (2006.01)
*C08J 5/00* (2006.01)
*C08G 65/00* (2006.01)
*C08G 65/336* (2006.01)

(52) U.S. Cl.
CPC ............ *C08L 71/00* (2013.01); *C08G 65/007* (2013.01); *C08G 65/336* (2013.01); *C08J 5/00* (2013.01); *C08L 2201/02* (2013.01); *C08L 2203/20* (2013.01)

(58) Field of Classification Search
CPC .. C08L 27/12; C08L 27/22; C08L 2205/035; C08L 2205/05; C08L 71/00
See application file for complete search history.

(56) References Cited

U.S. PATENT DOCUMENTS

| 3,159,601 A | 12/1964 | Ashby | |
|---|---|---|---|
| 3,159,662 A | 12/1964 | Ashby | |
| 3,220,972 A | 11/1965 | Lamoreaux | |
| 3,775,452 A | 11/1973 | Karstedt | |
| 6,040,400 A * | 3/2000 | Fukuda | C08F 16/24 526/126 |
| 6,297,339 B1 | 10/2001 | Osawa et al. | |
| 6,417,311 B1 | 7/2002 | Fukuda et al. | |
| 6,979,710 B2 * | 12/2005 | Osawa | C08G 65/007 524/588 |
| 8,912,278 B2 * | 12/2014 | Imada | C09K 5/00 524/261 |
| 2004/0186225 A1 * | 9/2004 | Yamaguchi | C09D 183/08 524/588 |
| 2005/0090602 A1 * | 4/2005 | Koshikawa | C08G 65/007 524/544 |
| 2005/0277731 A1 * | 12/2005 | Fukuda | C08K 5/5406 524/588 |
| 2006/0270791 A1 * | 11/2006 | Kishita | C08G 77/46 524/861 |
| 2011/0237732 A1 * | 9/2011 | Matsuda | C08G 65/007 524/493 |
| 2011/0300388 A1 | 12/2011 | Yokota | |
| 2013/0240778 A1 | 9/2013 | Imada | |

FOREIGN PATENT DOCUMENTS

| JP | 60-130648 A | * 7/1985 | .............. C08L 83/07 |
|---|---|---|---|
| JP | 11-116685 A | 4/1999 | |
| JP | 2000-7835 A | 1/2000 | |
| JP | 2001-72868 A | 3/2001 | |
| JP | 2002-327100 A | * 11/2002 | .............. C08L 71/00 |
| JP | 2010-232535 | 10/2010 | |
| JP | 2010-248280 | 11/2010 | |
| JP | 2013-194117 A | 9/2013 | |
| WO | 2010/095601 A1 | 8/2010 | |

* cited by examiner

*Primary Examiner* — Rip A Lee
(74) *Attorney, Agent, or Firm* — The Webb Law Firm

(57) ABSTRACT

A shaped product obtained by allowing a polymer (A) and a compound (B) to undergo hydrosilylation reaction, the polymer (A) and the compound (B) being contained in an uncrosslinked composition including the polymer (A), the compound (B) and a functional filler (C), wherein the polymer (A) is crosslinked by the compound (B) and the resulting crosslinked product is filled with the functional filler (C) dispersed therein, the polymer (A) includes (A1) a polymer of a perfluoropolyether skeleton having one alkenyl group and (A2) a polymer of a perfluoropolyether skeleton having two hydrosilyl [SiH] groups, the compound (B) includes (B1) a compound having two alkenyl groups and/or (B2) a compound having three hydrosilyl groups, and in the uncrosslinked composition, the content of the polymer (A) is 50 to 98 parts by weight based on 100 parts by weight of the total amount of the polymer (A) and the compound (B), and the content of the functional filler (C) is 50 to 500 parts by weight based on 100 parts by weight of the total amount of the polymer (A) and the compound (B).

20 Claims, No Drawings

SHAPED PRODUCT SUPPRESSED IN BLEEDING AND PRODUCTION PROCESS THEREFOR

CROSS-REFERENCE TO RELATED APPLICATIONS

This application is the United States national phase of International Application No. PCT/JP2013/072352 filed Aug. 22, 2013, and claims priority to Japanese Patent Application No. 2012-186378 filed Aug. 27, 2012, the disclosures of which are hereby incorporated in their entirety by reference.

TECHNICAL FIELD

The present invention relates to a shaped product and a production process therefor. More particularly, the present invention relates to a shaped product in which a polymer having a perfluoropolyether skeleton has been sterically crosslinked and the crosslinked polymer is highly filled with a functional filler, and a production process therefor.

BACKGROUND ART

Devices such as semiconductor (power chip, power transistor) manufacturing devices and vacuum devices (PVD, CVD) themselves generate a large quantity of heat with increase in speed or increase in integration, and temperature rise of the devices due to the heat causes malfunction and failure. On that account, how the heat generated in a larger quantity than before is removed without increasing the size and/or the weight of the device is a serious problem.

Such a problem is coped with by the use of a thermally conductive member wherein a rubber•gel or a grease is filled with a thermally conductive filler. The above devices that are objects of heat removal have parts that are used at not lower than 200° C., and therefore, they are required to have not only thermal conduction property but also extremely high heat resistance.

In particular, a gel•rubber shaped product is more easily processed as compared with a grease, so that it has been paid attention, and for such a shaped product, properties of low hardness, high elasticity and high releasability are desired in order to efficiently carry out thermal conduction.

As materials having high heat resistance among the materials of the conventional gel•rubber shaped products, silicone-based materials can be mentioned. The silicone-based shaped products, however, have a problem that siloxane or the like is emitted as a gas (outgas) and also has a problem that they are insufficient in resistance to heat of not lower than 200° C.

Then, in patent literatures 1 and 2, a problem of emission of siloxane as outgas from a thermally conductive shaped product and a problem of heat resistance of a thermally conductive shaped product have been solved by adopting a fluorine-based gel (specifically, "SIFEL (registered trademark)" available from Shin-Etsu Chemical Co., Ltd.) as a base material of a thermally conductive shaped product.

However, the binder "SIFEL" used for the thermally conductive shaped product of the patent literatures 1 and 2 has poor film-formability as compared with the conventional silicone rubber, and hence, with increase in the filling quantity, the formability of the SIFEL tends to be seriously lowered. Therefore, in order to obtain a shaped product, it is necessary to improve the shaped product strength to a certain extent by, for example, increasing the amount of a fibrous material added. By using such a technique, a shaped product is obtained, but the shaped product has high hardness, and it tends to be difficult to satisfy low hardness property that is required for a gel shaped product.

In order to lower hardness of a sheet, a technique of adding a large amount of a silicone oil or a fluorinated oil is generally used. However, when the sheet is used at a high temperature, there is a fear that the plasticizer component bleeds on the surface of the sheet (bleeding phenomenon) to stain the periphery of the sheet.

In a patent literature 3, there is disclosed a thermally conductive sheet which exhibits high heat resistance and has both of low hardness and high surface tack even if it is highly filled with a thermally conductive filler, by blending four kinds of SIFEL that are different in the types of the functional end groups and the number thereof. However, control of crosslinking is difficult, and there is a fear of bleeding of the uncrosslinked polymer component.

CITATION LIST

Patent Literature

Patent literature 1: WO 2010/95601
Patent literature 2: JP-A 2010-232535
Patent literature 3: JP-A 2012-061767

SUMMARY OF INVENTION

Technical Problem

It is an object of the present invention to provide a shaped product which is excellent in functional properties (e.g., thermal conduction property), shape followability, etc. and rarely suffers bleeding of a plasticizer or an uncrosslinked polymer component, and a production process for the shaped product.

SUMMARY OF THE INVENTION

In the "SIFEL (trade name of Shin-Etsu Chemical Co., Ltd.)", which is a fluorinated gel used in the patent literatures 1 and 2, the number of crosslinked sites at both ends of a molecule is only not more than 2/molecule in total. Therefore, the structure of the crosslinked product thereof is linear, and the resulting cured product tends to have low film-forming property and low elasticity. Hence, in order to cope with lowering of formability accompanying filling with a filler, reinforcement must be made by forming a large number of crosslinked sites or adding a PTFE fibrous material, and as a result, obtainable is only a shaped product having high hardness.

Then, by bonding a compound having vinyl groups of not less than 3/molecule or hydrosilyl [SiH] groups of 3/molecule, such as a silicone polymer, to a polymer of a perfluoropolyether skeleton having a functional group capable of reaction with such a compound, such as SIFEL, thereby giving SITEL crosslinked sites of not less than 3/molecule and thereby making the crosslinked structure steric (three-dimensional crosslinked structure), the present inventors have improved formability such as film-formability. Moreover, by forming a network chain structure in the polymer through the crosslinking to shut an uncrosslinked polymer component inside the network chain structure, the present inventors have succeeded reduction of bleeding. Furthermore, the present inventors have found that even if a large amount of a functional filler is added to the material for producing a shaped product, a shaped product having low hardness and high elasticity can be obtained by carrying out the above crosslinking reaction in the presence of the functional filler, because there is no need to make reinforcement such as formation of a large number of crosslinked sites. Thus, the present inventors have achieved the present invention.

That is to say, the shaped product of the present invention is a shaped product obtained by allowing a polymer (A) and a compound (B) to undergo hydrosilylation reaction, the polymer (A) and the compound (B) being contained in an uncrosslinked composition comprising the polymer (A), the compound (B) and a functional filler (C), wherein the polymer (A) is crosslinked by the compound (B), and the resulting crosslinked product is filled with the functional filler (C) dispersed therein, the polymer (A) comprises (A1) a polymer of a perfluoropolyether skeleton having one alkenyl group, and (A2) a polymer of a perfluoropolyether skeleton having two hydrosilyl [SiH] groups, the compound (B) comprises (B1) a compound having two alkenyl groups, and/or (B2) a compound having three hydrosilyl groups, and in the uncrosslinked composition, the content of the polymer (A) is 50 to 98 parts by weight based on 100 parts by weight of the total amount of the polymer (A) and the compound (B), and the content of the functional filler (C) is 50 to 500 parts by weight based on 100 parts by weight of the total amount of the polymer (A) and the compound (B).

It is preferable that the uncrosslinked composition further comprises, as the polymer (A), (A3) a polymer of a perfluoropolyether skeleton having two alkenyl groups, and (A4) a polymer of a perfluoropolyether skeleton having one hydrosilyl group, and further comprises, as the compound (B), (B3) a compound having three or more alkenyl groups, and/or (B4) a compound having four or more hydrosilyl groups.

It is preferable that the uncrosslinked composition further comprises (D) a platinum-based catalyst, (E) a fluorinated oil and (F) a silane coupling agent and/or a surface active agent.

The shaped product of the present invention preferably has the following properties:

the 10% compressive load of the shaped product before heating under the conditions of 200° C. and 72 hours in the atmosphere is not more than 60 N/cm$^2$;

the change ratio of a 10% compressive load of the shaped product after heating under the conditions of 200° C. and 72 hours in the atmosphere to a 10% compressive load thereof before heating under the same conditions is not more than 30%;

the thermal resistance value is not more than 6.0° C./W;

the tensile strength is not less than 1.0 MPa, and the tensile elongation is not less than 50%;

the surface hardness (ASKER C hardness) is not more than 60; and the weight decrease ratio of a weight of the shaped product after heating under the conditions of 200° C. and 72 hours to a weight thereof before heating under the same conditions is not more than 2.0%.

The production process for a shaped product of the present invention is a production process for a shaped product, comprising:

a step of allowing a polymer (A), a compound (B) and a functional filler (C) to be contained to prepare an uncrosslinked composition, and a step of allowing the polymer (A) and the compound (B) contained in the uncrosslinked composition to undergo hydrosilylation reaction and thereby crosslinking the polymer (A) by the compound (B) to fill the resulting crosslinked product with the functional filler dispersed therein, wherein:

the polymer (A) comprises (A1) a polymer of a perfluoropolyether skeleton having one alkenyl group, and (A2) a polymer of a perfluoropolyether skeleton having two hydrosilyl [SiH] groups, the compound (B) comprises (B1) a compound having two alkenyl groups, and/or (B2) a compound having three hydrosilyl groups, and in the preparation of the uncrosslinked composition, the polymer (A) is contained in an amount of 50 to 98 parts by weight based on 100 parts by weight of the total amount of the polymer (A) and the compound (B), and the functional filler (C) is contained in an amount of 50 to 500 parts by weight based on 100 parts by weight of the total amount of the polymer (A) and the compound (B).

In the production process of the present invention, it is preferable that the uncrosslinked composition further comprises, as the polymer (A), (A3) a polymer of a perfluoropolyether skeleton having two alkenyl groups, and (A4) a polymer of a perfluoropolyether skeleton having one hydrosilyl group, and further comprises, as the compound (B), (B3) a compound having three or more alkenyl groups, and/or (B4) a compound having four or more hydrosilyl groups.

The uncrosslinked composition may further comprise (D) a platinum-based catalyst and (E) a fluorinated oil.

In the production process of the present invention, it is preferable that the uncrosslinked composition further comprises (F) a silane coupling agent and/or a surface active agent, and the production process further comprises, before the preparation step for the uncrosslinked composition, a step of surface-treating the functional filler (C) in advance using (F) the silane coupling agent and/or the surface active agent.

In the shaped product of the present invention, the polymer (A) that becomes a skeleton of the shaped product has been sterically crosslinked by the compound (B), that is, a three-dimensional network chain structure chemically and physically stabilized has been formed, and therefore, production of shaped products of various shapes such as a film becomes feasible while achieving low hardness and high elasticity under the conditions of high filling with a filler, said achievement having been difficult so far.

Further, in the shaped product of the present invention, a network chain structure has been formed by crosslinking, and the polymer (A) component and the like which do not contribute to the crosslinking reaction are shut in the network chain structure, so that bleeding is reduced.

By setting the shaped product of the present invention in a place where higher thermal conduction property and shape followability are required, for example, between a heat generation member and a radiation member of a device for generating a large quantity of heat, such as a semiconductor part manufacturing device, in such a manner that the shaped product comes into close contact with these members, thermal conduction can be efficiently carried out. That is to say, the reason why the thermal conduction is efficiently carried out is that the adhesion of the shaped product of the present invention to the interface between the heat generator and the radiator has been improved because the shaped product has low hardness and high flexibility.

Moreover, the shaped product of the present invention has been improved in releasability from a mold for molding and in handling property, and it rarely suffers high-temperature deterioration.

DETAILED DESCRIPTION OF THE INVENTION

The shaped product of the present invention and a production process for the shaped product are described in detail hereinafter.

Shaped Product

The shaped product of the present invention is obtained by carrying out crosslinking reaction using an uncrosslinked composition comprising the following components in specific amounts.

Examples of the components contained in the uncrosslinked composition include:

(A1) a polymer of a perfluoropolyether skeleton having one alkenyl group, and (A2) a polymer of a perfluoropolyether skeleton having two hydrosilyl groups, (these are together referred to as a "polymer (A)" or a "component (A)" hereinafter), (B1) a compound having two alkenyl groups, and/or (B2) a compound having three hydrosilyl groups, (these are together referred to as a "compound (B)" or a "component (B)" hereinafter), and (C) a functional filler, and preferably, further include:

(D) a platinum-based catalyst, (E) a fluorinated oil, and (F) a silane coupling agent and/or a surface active agent.

The contents of these components are as follows.

In 100 parts by weight of the total amount of the polymer (A) (polymer (A1) and polymer (A2)) and the compound (B) (compound (B1) and/or compound (B2)), the content of the polymer (A) (polymer (A1) and polymer (A2)) is 50 to 98 parts by weight, and is preferably 75 to 95 parts by weight from the viewpoints of flexibility and bleeding property, and based on 100 parts by weight of the total amount of the polymer (A) (polymer (A1) and polymer (A2)) and the compound (B) (compound (B1) and/or compound (B2)), the content of the functional filler (C) is 50 to 500 parts by weight, and the content of the platinum-based catalyst (D) is preferably 0.0001 to 1.0 part by weight.

The crosslinking reaction in the uncrosslinked composition is hydrosilylation reaction of the polymer (A) (polymer (A1) and polymer (A2)) with the compound (B) (compound (B1) and/or compound (B2)), preferably hydrosilylation reaction of an alkenyl group of the polymer (A1) with a hydrosilyl group of the compound (B2) and hydrosilyation reaction of a hydrosilyl group of the polymer (A2) with an alkenyl group of the compound (B1), and these reactions are catalyzed by the platinum-based catalyst (D).

The shaped product of the present invention is a shaped product in which at least flat network crosslinking, preferably steric (three-dimensional) crosslinking, has been carried out by such a reaction as above and the crosslinked product is filled with the functional filler (C) dispersed therein, and is typically a thermally conductive sheet.

In other words, in the present invention, the shaped product is obtained by crosslinking the polymer (A) by the compound (B) in the presence of the functional filler (C). Therefore, it is presumed that the crosslinked product (particularly, its network structure) is favorably filled with the functional filler (C) which is (homogenously) dispersed therein, and moreover, also the polymer (A) and the functional filler (C) probably adhere or are bonded physically or chemically to each other closely, so that a shaped product, such as a sheet, which is excellent in the aforesaid properties (flexibility, low bleeding property, thermal conduction property, etc.) is obtained. Particularly when the functional filler (C) has been surface-treated in advance, such improvement in homogenization in dispersing and such improvement in properties due to strict adhesion or bonding (e.g., improvement in thermal conductivity, lowering of thermal resistance value) as above tend to become remarkable.

Since the shaped product of the present invention is excellent in thermal conduction property, it is preferable as a radiator sheet (also referred to as a "thermally conductive shaped product" in the present specification"), but the use of the shaped product is not limited to this.

The "crosslinking" in the present invention means that bridging is formed between a polymer molecule and a polymer molecule. When bridging is formed between ends of polymer molecules, the polymer molecular chain is only lengthened, therefore this is not called crosslinking.

It is preferable that the uncrosslinked composition for use in the present invention further contains, as the polymer (A), (A3) a polymer of a perfluoropolyether skeleton having two alkenyl groups, and (A4) a polymer of a perfluoropolyether skeleton having one hydrosilyl group, and contains, as the compound (B), (B3) a compound having three or more alkenyl groups, and/or (B4) a compound having four or more hydrosilyl groups.

In this case, in 100 parts by weight of the total amount of the polymer (A) (polymers (A1), (A2), (A3) and (A4)) and the compound (B) (compound (B1) and/or compound (B2), and compound (B3) and/or compound (B4)), the content of the polymer (A) (polymers (A1) to (A4)) is 50 to 98 parts by weight, and is preferably 75 to 95 parts by weight from the viewpoints of flexibility and bleeding property.

[Polymer (A)]

The polymer (A) for use in the present invention comprises the above polymers (A1) and (A2), and each of these polymers contains a perfluoropolyether in its skeleton, has a functional group preferably at an end thereof, more preferably at an end of the main chain thereof, and has one alkenyl group (A1) or two hydrosilyl [SiH] groups (A2) in total including both end groups of the main chain.

It is preferable that the polymer (A) further contains, in addition to the polymers (A1) and (A2), (A3) a polymer of a perfluoropolyether skeleton having two alkenyl groups, and (A4) a polymer of a perfluoropolyether skeleton having one hydrosilyl group.

The functional groups of the polymer (A) can undergo hydrosilylation reaction, in which a by-product is rarely produced, with the alkenyl group and the hydrosilyl group that are functional groups of the compound (B). Generalized hydrosilylation reactions are shown in the following formulae (I) and (II). $R_1$ and $R_2$ in the formulae each represent an appropriate group.

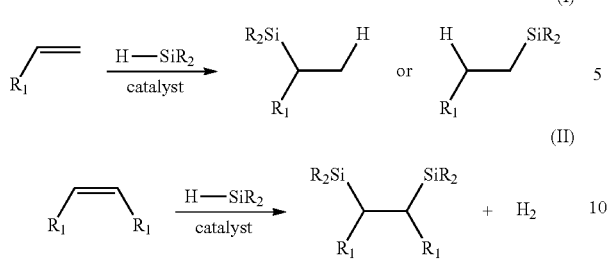

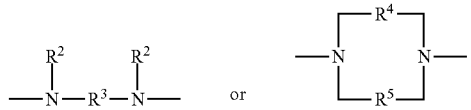

In many cases, in the hydrosilylation reaction, the alkenyl group (preferably vinyl group) and the hydrosilyl group react with each other in a molar ratio of 1:1 in accordance with the above formula (I), but in rare cases, the alkenyl group and the hydrosilyl group react with each other in a molar ratio of 1:2 in accordance with the above formula (II).

The polymer (A) is a fluorine resin, so that the polymer (A) is preferable from the viewpoints of high heat resistance of the resulting shaped product and from the viewpoint that the shaped product is free from outgassing of siloxane or other components.

<<Polymers (A1) and (A3) Having Alkenyl Group>>

The polymer (A1) is a polymer of a perfluoropolyether skeleton having one alkenyl group, preferably a polymer of a perfluoropolyether skeleton having one alkenyl group at each end of the main chain (two alkenyl groups in total) (that is, polymer (A3)), and undergoes hydrosilylation reaction with the compound (B2) having three hydrosilyl groups (preferably compound (B2) or (B4)).

Examples of the polymer (A1) having an alkenyl group include a compound having a divalent perfluoropolyether group among fluorine-containing amide compounds having an alkenyl group (also referred to as "fluorine-containing amide compounds" or "alkenyl group-containing fluorine-containing amide compounds" simply hereinafter) described in paragraphs [0007] to [0043] of a patent literature, JP-A 2001-72868, and this fluorine-containing amide compound has at least one alkenyl group, preferably two alkenyl groups at both ends, in a molecule. This fluorine-containing amide compound having an alkenyl group is preferably that having the following bond.

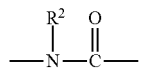

This fluorine-containing amide compound can further contain the following bond.

The alkenyl group-containing fluorine-containing amide compound is particularly preferably a compound represented by the following general formula (1).

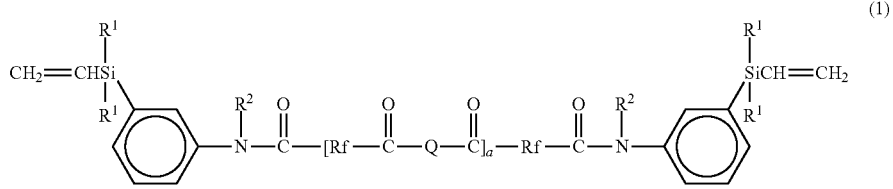

In the formula (1), $R^1$ is a substituted or unsubstituted monovalent hydrocarbon group, $R^2$ is hydrogen atom or a substituted or unsubstituted monovalent hydrocarbon group, Q is represented by the following general formula (2) or (3), Rf is a divalent perfluoropolyether group, and a is an integer of 0 or greater.

wherein $R^3$ is a substituted or unsubstituted divalent hydrocarbon group midway in the bond of which one or more kinds of oxygen atom, nitrogen atom and silicon atom may be interposed, and $R^2$ is the same group as above.

$$\begin{array}{c} \phantom{x} \\ \text{—N} \quad \text{N—} \\ \end{array} \quad (3)$$

wherein $R^4$ and $R^5$ are each a substituted or unsubstituted divalent hydrocarbon group.

$R^1$ in the formula (1) is a substituted or unsubstituted monovalent hydrocarbon group of 1 to 10 carbon atoms, particularly 1 to 8 carbon atoms, preferably that other than an aliphatic unsaturated bond. Examples of such groups include alkyl groups such as methyl group, ethyl group, propyl group, isopropyl group, butyl group, isobutyl group, tert-butyl group, pentyl group, hexyl group, octyl group and decyl group, cycloalkyl groups such as cyclopentyl group, cyclohexyl group and cycloheptyl group, alkenyl groups such as vinyl group, allyl group, propenyl group, isopropenyl group, butenyl group and hexenyl group, aryl groups such as phenyl group, tolyl group, xylyl group and naphthyl group, aralkyl groups such as benzyl group, phenylethyl group and phenylpropyl group, and halogen-substituted alkyl groups wherein halogen atoms, etc. are substituted for apart or all of hydrogen atoms in the above groups, such as chloromethyl group, chloropropyl group, bromoethyl group, 3,3,3-trifluoropropyl group and 6,6,6,5,5,4,4,3,3-nonafluorohexyl group.

$R^2$ in the formula (1) is hydrogen atom or the same substituted or unsubstituted monovalent hydrocarbon group of 1 to 10 carbon atoms, particularly 1 to 8 carbon atoms, preferably that other than an aliphatic unsaturated bond, as given as an example of the above $R^1$. As the monovalent hydrocarbon group, the same group as $R^1$ can be mentioned, and examples thereof include alkyl groups such as methyl group, ethyl group, propyl group and isopropyl group, cycloalkyl groups such as cyclohexyl group, alkenyl groups such as vinyl group and allyl group, aryl groups such as phenyl group and tolyl group, and halogen-substituted alkyl groups wherein halogen atoms, etc. are substituted for a part or all of hydrogen atoms in the above groups, such as chloromethyl group, chloropropyl group, 3,3,3-trifluoropropyl group and 6,6,6,5,5,4,4,3,3-nonafluorohexyl group.

$R^3$ in the formula (2) is not specifically restricted provided that it is a substituted or unsubstituted divalent hydrocarbon group, and is preferably a divalent hydrocarbon group of 1 to 20 carbon atoms, particularly 2 to 10 carbon atoms. Specific examples thereof include alkylene groups such as methylene group, ethylene group, propylene group, methylethylene group, butylene group and hexamethylene group, cycloalkylene groups such as cyclohexylene group, arylene groups such as phenylene group, tolylene group, xylylene group, naphthylene group and biphenylene group, groups wherein halogen atoms, etc. are substituted for a part or all of hydrogen atoms in the above groups, and combinations of these substituted or unsubstituted alkylene groups and arylene groups. $R^3$ may contain one or more kinds of oxygen atom, nitrogen atom and silicon atom midway in the bond. In this case, the oxygen atom can be interposed as —O—, the nitrogen atom can be interposed as —NR'— (R' is a hydrogen atom, an alkyl group of 1 to 8 carbon atoms, particularly 1 to 6 carbon atoms, or an aryl group), and the silicon atom can be interposed as a group containing straight-chain or cyclic organosiloxane or an organosilylene group, as in the following groups.

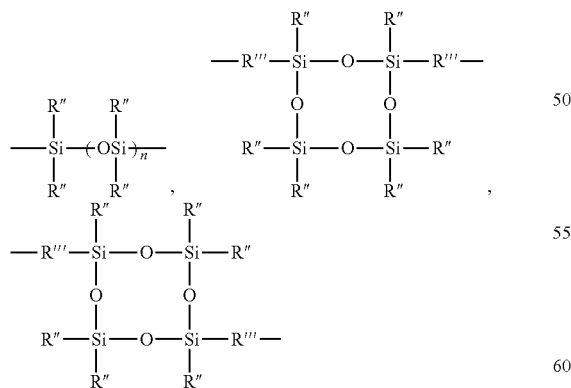

wherein R″ is the same alkyl group of 1 to 8 carbon atoms or aryl group as given as an example of the above $R^1$ and $R^2$, R‴ is the same alkylene group of 1 to 6 carbon atoms or arylene group as given as an example of the above $R^3$, and n is an integer of 0 to 10, particularly 0 to 5.

Examples of such groups include the following groups.

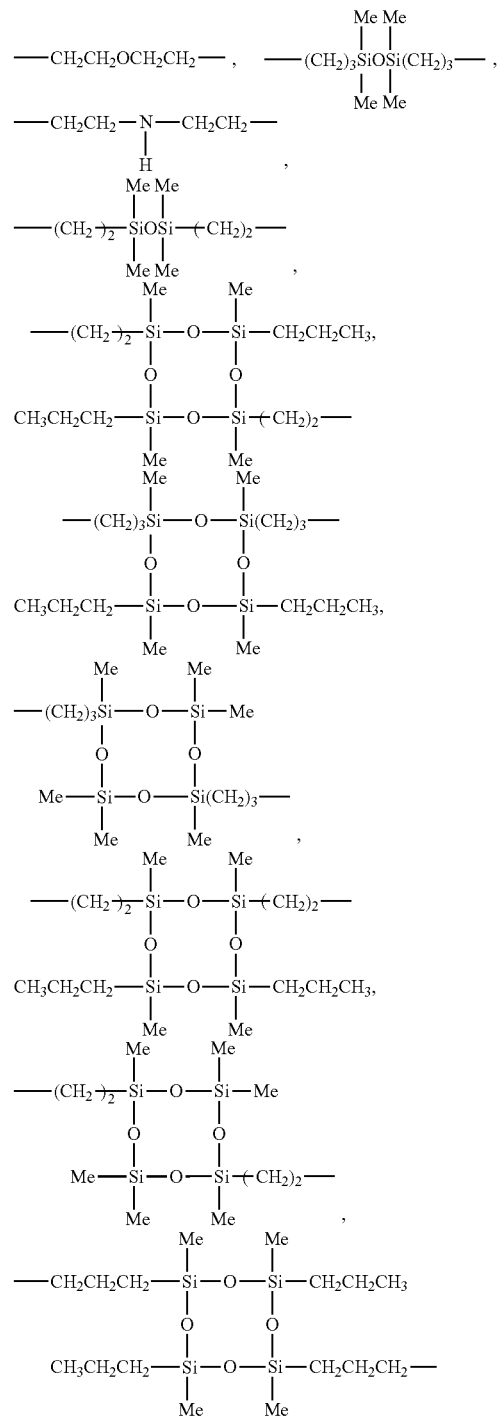

wherein Me is a methyl group.

$R^4$ and $R^5$ in the formula (3) are each preferably a substituted or unsubstituted divalent hydrocarbon group of 1 to 10 carbon atoms, particularly 2 to 6 carbon atoms, and specific examples thereof include alkylene groups such as methylene group, ethylene group, propylene group, methylethylene group, butylene group and hexamethylene group, cycloalkylene groups such as cyclohexylene group, and groups wherein halogen atoms, etc. are substituted for a part or all of hydrogen atoms in the above groups.

Specific examples of Q in the formula (1), which is represented by the aforesaid formula (2) or (3), include the following groups. In the following chemical formulae, Me represents a methyl group, and Ph represents a phenyl group.

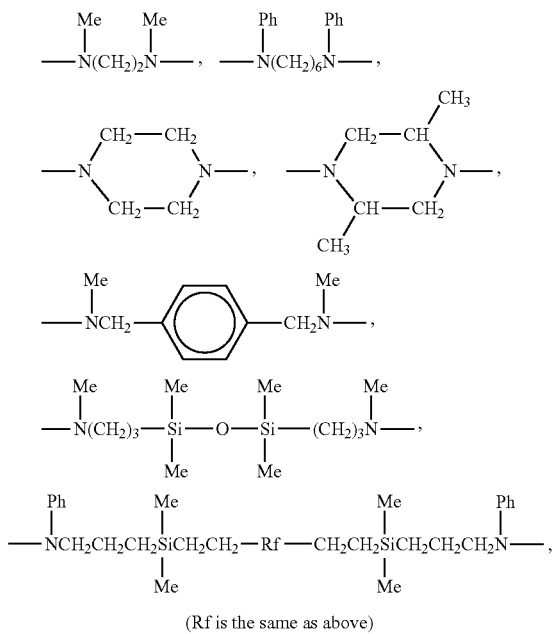

(Rf is the same as above)

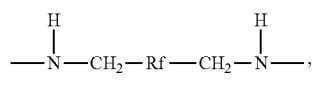

(Rf is the same as above)

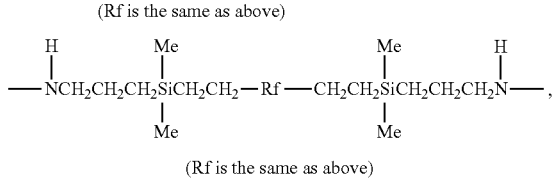

(Rf is the same as above)

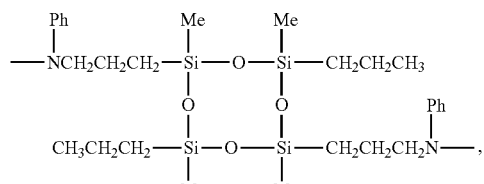

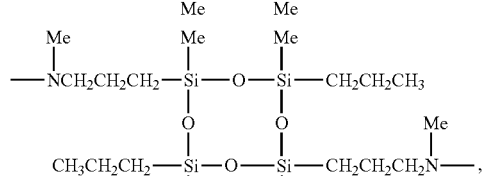

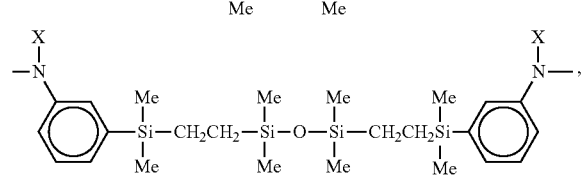

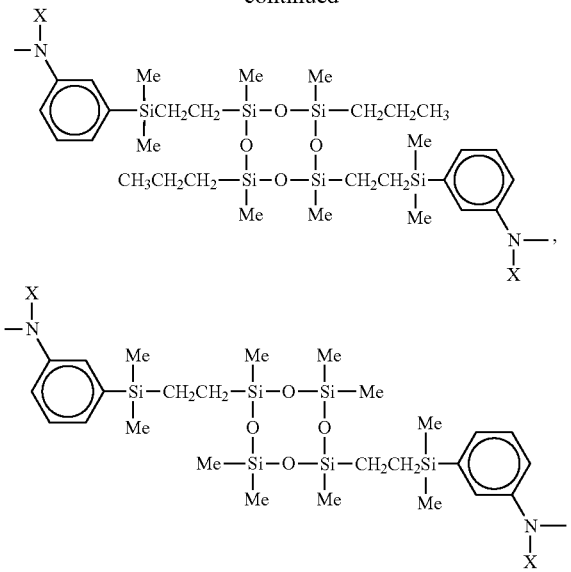

wherein X is a hydrogen atom, a methyl group or a phenyl group.

In the formula (1), Rf is a divalent perfluoropolyether group, and particularly as the divalent perfluoropolyether groups, those represented by the following formulae are preferable.

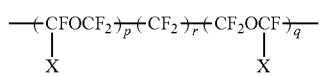

wherein X is F or $CF_3$ group, and p, q and r are integers satisfying the conditions of $p \geq 1$, $q \geq 1$, $2 \leq p+q \leq 200$, particularly $2 \leq p+q \leq 110$, and $0 \leq r \leq 6$,

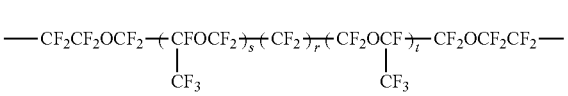

wherein r, s and t are integers satisfying the conditions of $0 \leq r \leq 6$, $s \geq 0$, $t \geq 0$ and $0 \leq s+t \leq 200$, particularly $2 \leq s+t \leq 110$,

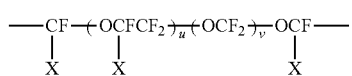

wherein X is F or $CF_3$ group, and u and v are integers satisfying the conditions of $1 \leq u \leq 20$ and $1 \leq v \leq 20$, and

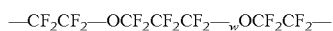

wherein w is an integer of $1 \leq w \leq 100$.

Specific examples of Rf include the following groups.

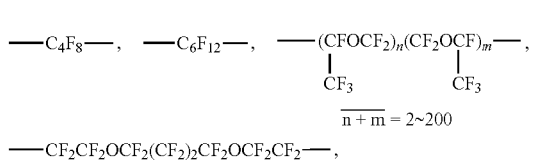

-continued $$—CF_2CF_2OCF_2CFOCF_2(CF_2)_2CF_2OCFCF_2OCF_2CF_2—$$
$$| \qquad \qquad \qquad \qquad |$$
$$CF_3 \qquad \qquad \qquad \qquad CF_3 \qquad ,$$

$$—CF_2(OCF_2CF_2)_{\overline{n}}(OCF_2)_{\overline{m}}OCF_2—,$$

$$\overline{n} = 5\sim50, \overline{m} = 1\sim10$$

$$—CF_2(OCFCF_2)_{\overline{n}}(OCF_2)_{\overline{m}}OCF——,$$
$$| \qquad | \qquad \qquad \qquad |$$
$$CF_3 \quad CF_3 \qquad \qquad \quad CF_3$$

$$\overline{n} = 5\sim50, \overline{m} = 1\sim10$$

$$—CF_2CF_2(OCF_2CF_2CF_2)_{\overline{n}}OCF_2CF_2—$$

$$\overline{n} = 5\sim100$$

In the aforesaid formula (1), a is an integer of 0 or greater, and therefore, the fluorine-containing amide compound of the formula (1) contains one or more divalent perfluoropolyether groups in one molecule, and a is preferably an integer of 0 to 10, particularly 1 to 6.

As such fluorine-containing amide compounds, polymers from low-viscosity polymers having a viscosity of several tens cs to solid crude rubber-like polymers can be used. From the viewpoint of ease of handling, crude rubber-like polymers are preferably used for, for example, heat-vulcanized rubbers, and polymers having a viscosity of about 100 to 100,000 cs are preferably used for liquid rubbers. If the viscosity is too low, elongation of the resulting shaped product as an elastomer is lowered, and properties of good balance cannot be obtained in some cases.

The fluorine-containing amide compound of the formula (1) can be obtained by the following process. That is to say, the fluorine-containing amide compound of the formula (1) wherein a is 0 can be synthesized by, for example, allowing a compound having acid fluoride groups at both ends, which is represented by the following general formula (4), and a primary or secondary amine compound represented by the following general formula (5) to react with each other in the presence of an acid acceptor such as trimethylamine.

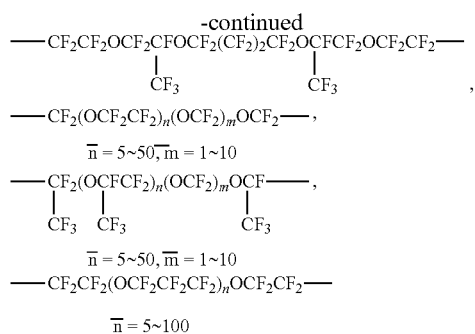

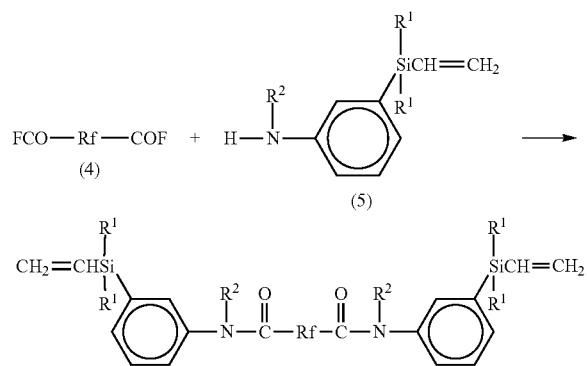

wherein $R^1$, $R^2$ and Rf are the same as above.

The fluorine-containing amide compound of the formula (1) wherein a is an integer of 1 or greater can be synthesized by, for example, allowing a compound having acid fluoride groups at both ends, which is represented by the above formula (4), and a diamine compound represented by the following general formula (6) to react with each other in the presence of an acid acceptor and further allowing the reaction product and a primary or secondary amine compound represented by the above formula (5) to react with each other.

$$H\text{-}Q\text{-}H \qquad \qquad (6)$$

wherein Q is the same as above.

In this case, the ratio of the charge amount of the compound of the formula (4) having acid fluoride groups at both ends to the charge amount of the primary or secondary amine compound of the formula (5) is not specifically restricted, but it is preferable that the ratio (a)/(b) of the charge amount (a) of the compound of the formula (4) in terms of mol to the charge amount (b) of the compound of the formula (5) in terms of mol is 0.1 to 1.2 mol/mol, particularly 0.2 to 0.5 mol/mol.

The charge amount (a) of the compound of the formula (4) and the charge amount (c) of the compound of the formula (6) are not specifically restricted as long as (a) in terms of mol is not smaller than (c) in terms of mol. By controlling the value of (a)/(c), the number a of the repeating units in the formula (1) can be set to an appropriate value according to the purpose. By increasing the value of (a)/(c), a polymer having a relatively low molecular weight can be synthesized, and if the value of (a)/(c) is brought close to 1, a polymer having a high molecular weight can be synthesized.

Although the reaction conditions are not specifically restricted, it is desirable to carry out the reaction at 20 to 200° C. for 1 to 8 hours, preferably 20 to 50° C. for 2 to 4 hours.

The fluorine-containing amide compound of the formula (1) wherein Q contains a silicon atom interposed can be synthesized by, for example, synthesizing a compound having vinyl groups at both ends, which is represented by the following general formula (7), through the above reaction using, for example, the amine compound of the formula (5) as the primary or secondary amine compound having an aliphatic unsaturated group such as vinyl group and allyl group, and then allowing this compound and, for example, an organosiloxane compound having two hydrosilyl groups in a molecule, which is represented by the following general formula (8), to react with each other in the presence of an addition reaction catalyst.

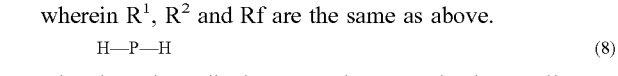

wherein $R^1$, $R^2$ and Rf are the same as above.

$$H—P—H \qquad \qquad (8)$$

wherein P is a divalent organic group having a siloxane bond, and specific examples thereof include the following groups.

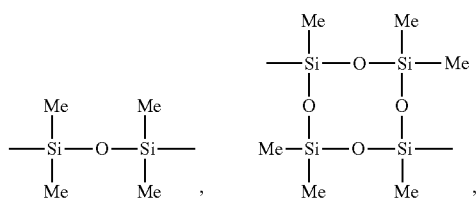

-continued

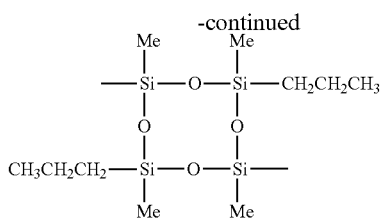

With regard to the ratio of the charge amount of the compound having vinyl groups at both ends, which is represented by the formula (7), to the charge amount of the compound of the formula (8) in the above reaction, the charge amount (d) of the compound of the formula (7) in terms of mol must be larger than the charge amount (e) of the compound of the formula (8) in terms of mol, but the ratio (d)/(e) is at most 2, that is, 2<(d)/(e)≤2. If the value of (d)/(e) is increased, a polymer having a relatively low molecular weight can be synthesized, and if the value of (d)/(e) is brought close to 1, a polymer having a high molecular weight can be synthesized.

In this case, examples of the addition reaction catalyst which can be used includes aperiodic table Group VIII element or its compound, such as chloroplatinic acid, alcohol-modified chloroplatinic acid (see U.S. Pat. No. 3,220, 972), a complex of chloroplatinic acid and an olefin (see U.S. Pat. No. 3,159,601, U.S. Pat. No. 3,159,662, U.S. Pat. No. 3,775,452), one in which platinum black, palladium or the like is supported on a carrier such as alumina, silica and carbon, a rhodium-olefin complex, and chlorotris(triphenylphosphine)rhodium (Wilkinson's catalyst). The amount thereof added can be a catalytic amount. The above complex is preferably used after it is dissolved in an alcohol-based, ketone-based, ether-based or hydrocarbon-based solvent. The reaction is preferably carried out under the conditions of 50 to 150° C., preferably 80 to 120° C., and 2 to 4 hours.

<<Polymers (A2) and (A4) Having Hydrosilyl Group>>

On the other hand, the polymer (A2) is a polymer of a perfluoropolyether skeleton having two hydrosilyl [SiH] groups, is preferably a polymer of a perfluoropolyether skeleton having one hydrosilyl group at each end of the main chain (total: two hydrosilyl groups), and undergoes hydrosilylation reaction with a compound (B1) having two alkenyl groups (preferably compound (B1) or (B3)).

Examples of such polymers (A2) having a hydrosilyl group include fluorine-containing organohydrogensiloxanes having a hydrosilyl group (also referred to as "fluorine-containing organohydrogensiloxanes" simply hereinafter), which are described in paragraphs [0044] to [0055] of a patent literature, JP-A2001-72868, and of these, those having one or more divalent perfluorooxyalkylene groups (perfluoropolyether groups) and two or more hydrosilyl groups in one molecule can be mentioned.

The polymer (A4) that is preferably used in combination with the polymer (A2) is a polymer of a perfluoropolyether skeleton having one hydrosilyl group, and examples thereof include the above-mentioned fluorine-containing organohydrogensiloxanes, and of these, those having one or more divalent perfluorooxyalkylene groups (perfluoropolyether groups) and one hydrosilyl group in one molecule.

Examples of the perfluorooxyalkylene group include, particularly, a divalent perfluorooxyalkylene group represented by the following general formula.

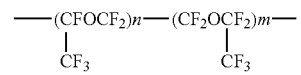

wherein m+n is an integer of 2 to 100.

This fluorine-containing organohydrogensiloxane may be cyclic or chain, may be of a three-dimensional network, and may be, particularly, those having, in one molecule, at least one monovalent organic group containing a perfluoroakyl group, a perfluoroalkylether group or a perfluoroalkylene group, which are represented by the following general formulae, as a monovalent substituent bonded to a silicon atom.

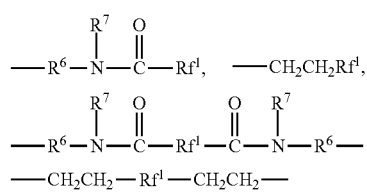

wherein $R^6$ is a divalent hydrocarbon group preferably having 1 to 10 carbon atoms, particularly 2 to 6 carbon atoms, e.g., an alkylene group such as methylene group, ethylene group, propylene group, methylethylene group, tetramethylene group or hexamethylene group, or an arylene group such as phenylene group; $R^7$ is a hydrogen atom or the same monovalent hydrocarbon group preferably having 1 to 8 carbon atoms, particularly 1 to 6 carbon atoms, as the aforesaid $R^2$; and $Rf^1$ is a monovalent perfluoroalkyl group mentioned in the above general formula, a monovalent perfluorooxyalkyl group, a divalent perfluorooxyalkylene group or a divalent perfluoroalkyl group.

Examples of the monovalent substituent bonded to a silicon atom other than the monovalent organic group containing a divalent fluorine-containing substituent, that is the perfluorooxyalkylene group, include a monovalent hydrocarbon group having 1 to 10 carbon atoms, particularly 1 to 8 carbon atoms, and preferably containing no aliphatic unsaturated bond, which is the same as the aforesaid $R^2$.

Although the number of silicon atoms in a molecule in this fluorine-containing organohydrogensiloxane is not limited to the above, it is usually 2 to 60, preferably about 4 to 30.

Examples of such fluorine-containing organohydrogensiloxanes include the following compounds, wherein Me represents a methyl group and Ph represents a phenyl group. These compounds may be used singly or in combination of two or more kinds.

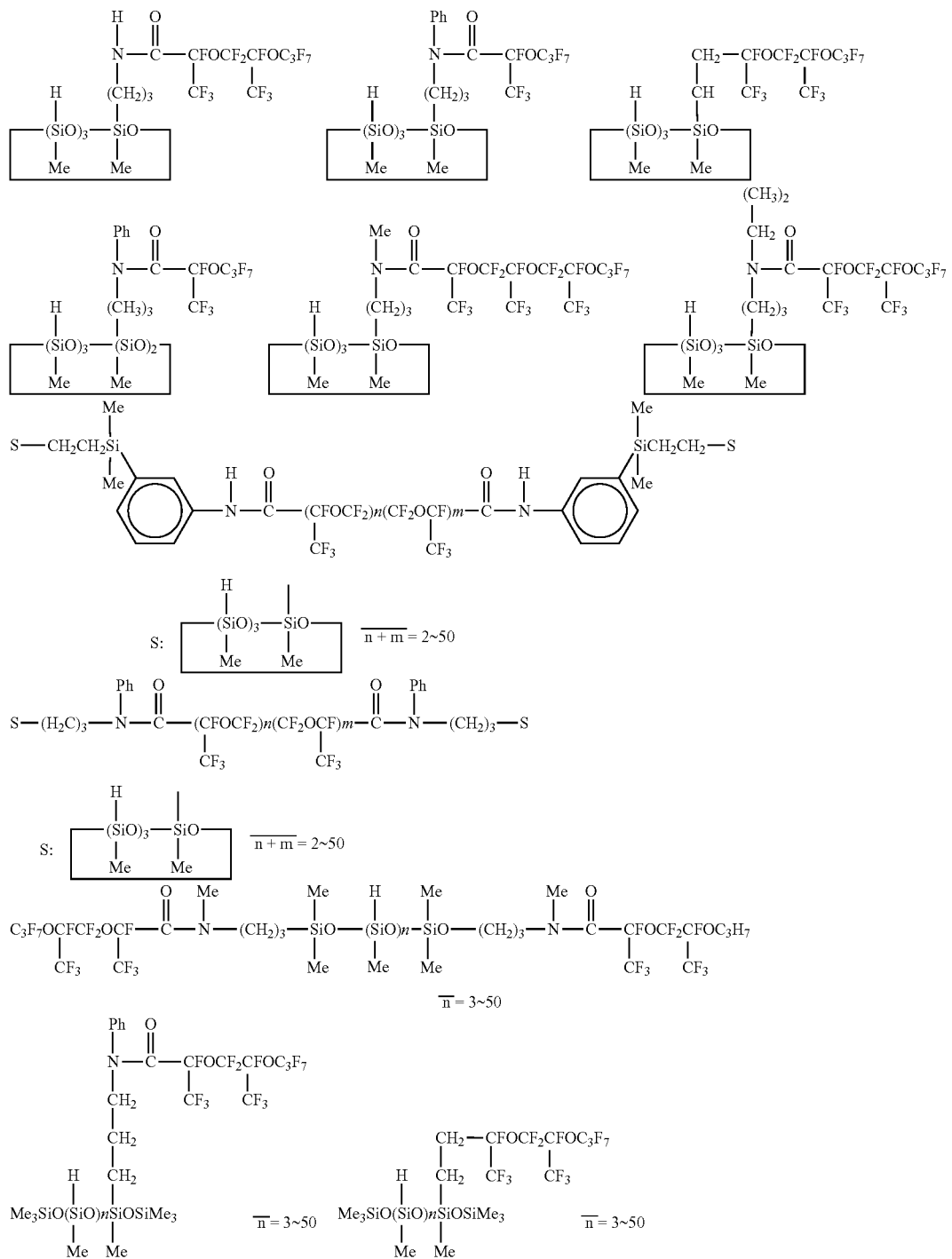

As such a polymer (A), an embodiment wherein the polymer (A1) having one alkenyl group in a molecule and the polymer (A3) having two alkenyl groups in a molecule are used in combination and the polymer (A2) having one hydrosilyl group in a molecule and the polymer (A4) having two hydrosilyl groups in a molecule are used in combination is preferable because control of the degree of crosslinking polymerization becomes easier.

As the mixing ratio in the polymer (A), the ratio of the polymer ((A1) or (A4)) having one alkenyl group (or hydrosilyl group) in a molecule to the polymer ((A2) or (A3)) having two alkenyl groups (or hydrosilyl groups) in a molecule is preferably 20:80 to 80:20 (by mol). When the ratio is in this range, control of the degree of crosslinking polymerization becomes easy, and a shaped product that has excellent sheet-forming property and keeps flexibility can be efficiently obtained.

As the polymer (A), specifically, a polymer having a vinyl group and contained in A liquid of "SIFEL" that is a two-pack curing type fluorine-based gel of a commercial product of Shin-Etsu Chemical Co., Ltd., and/or a polymer having a hydrosilyl group and contained in B liquid of the SIFEL is particularly preferable from the viewpoints of flexibility, low-temperature property and heat resistance of the resulting shaped product. SIFEL is disclosed in a patent literature, JP-A 2001-72868, and the A liquid of SIFEL corresponds to a fluorine-containing amide compound containing two perfluoropolyether groups among "(A) fluorine-containing amide compounds having at least one alkenyl group in a molecule" described in the above literature, and the B liquid of SIFEL corresponds to a fluorine-containing organohydrogensiloxane containing a divalent perfluoropolyether group among "(B) fluorine-containing organohydrogensiloxanes" described in the above literature.

[Compound (B)]

The compound (B) for use in the present invention comprises a compound (B1) having two alkenyl groups and a compound (B2) having three hydrosilyl groups, and it undergoes hydrosilylation reaction with a functional group of the polymer (A) and can be covalently bonded.

As the compound (B), an embodiment wherein the compound (B1) and a compound (B3) having three or more alkenyl group are used in combination and the compound (B2) and a compound (B4) having four or more hydrosilyl groups are used in combination is preferable.

Although the compound (B) is not specifically restricted provided that it has two or more alkenyl groups and three or more hydrosilyl groups, the compound (B1) is, for example, a silicone polymer having two or more vinyl groups, and the compound (B3) is, for example, triallyl isocyanurate having three vinyl groups.

As the compound (B1) or (B3), a polymer having two or more vinyl groups is preferable. Examples include an organopolysiloxane having, in one molecule, two or more alkenyl groups bonded to a silicon atom, which can be represented by the following formula.

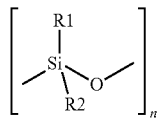

wherein each R1 is independently an unsubstituted or substituted monovalent hydrocarbon group having 1 to 20 carbon atoms and containing no aliphatic unsaturated bond, each R2 is independently an alkenyl group, and n is 2 to 10.

Examples of the unsubstituted or substituted monovalent hydrocarbon groups bonded to a silicon atom include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group and decyl group, aryl groups such as phenyl group, tolyl group, xylyl group and naphthyl group, aralkyl groups such as benzyl group, phenylethyl group and phenylpropyl group, alkenyl groups, such as vinyl group, allyl group, propenyl group, isopropenyl group, butenyl group, hexenyl group, cyclohexenyl group and octenyl group, and groups wherein halogen atoms such as fluorine, bromine and chlorine, cyano group, etc. are substituted for a part or all of hydrogen atoms in the above groups.

Examples of commercial products employable as such organopolysiloxanes include A liquid of "KE-1950-10", A liquid of "KE-1950-30", A liquid of "KE-1950-50" and A liquid of "X-34-4045", which are available from Shin-Etsu Chemical Co., Ltd. The viscosity range of them at 25° C. is 200 to 200,000 centipoise [cp].

In addition to the above, examples of typical commercial products employable as the polymers having two or more vinyl groups include fluorinated silicone rubber [FVMQ] (FE-241-U) available from Shin-Etsu Chemical Co., Ltd. and polybutadiene rubber [BR] (Nipol BR1220) available from Nippon Zeon Co., Ltd.

On the other hand, the compound (B2) is, for example, a silicone polymer having three hydrosilyl groups, and the compound (B4) is, for example, tetrakisdimethylsiloxane having four hydrosilyl groups.

As the compound (B2) or (B4), a polymer having three or more hydrosilyl groups (Si—H) is preferable. Examples include an organohydrogenpolysiloxane having three or more dihydrosilyls "—SiH$_2$—" in one molecule, and it can be represented by the formula "R3-(SiH$_2$O)n-R3".

In the above formula, each R3 is independently an unsubstituted or substituted monovalent hydrocarbon group of 1 to 12 carbon atoms, preferably 1 to 8 carbon atoms, is preferably that having no aliphatic unsaturated bond, and n is 2 to 10, preferably 3 to 10. Specific examples of R3 include alkyl groups such as methyl group, ethyl group, propyl group, isopropyl group, butyl group, isobutyl group, tert-butyl group, pentyl group, neopentyl group, hexyl group, cyclohexyl group, octyl group and decyl group, aryl groups such as phenyl group, tolyl group, xylyl group and naphthyl group, aralkyl groups such as benzyl group, phenylethyl group and phenylpropyl group, and groups wherein halogen atoms such as fluorine, bromine and chlorine, cyano group, etc. are substituted for apart or all of hydrogen atoms in the above groups. n is 1 to 10.

Examples of commercial products employable as such organohydrogenpolysiloxanes include A liquid of "KE-1950-10", B liquid of "KE-1950-30", B liquid of "KE-1950-50" and B liquid of "X-34-4045, which are available from Shin-Etsu Chemical Co., Ltd. The viscosity range of them at 25° C. is not more than 800 centipoise [cp].

As the compound (B), a commercial product such as a liquid silicone rubber "KE-1950-10 (A•B)" available from Shin-Etsu Chemical Co., Ltd. can be also preferably used, and this consists of A liquid and B liquid, and these liquids are both translucent liquids having a viscosity of 60 Pa·s (25° C.) when uncured.

When the compound (B) has an alkenyl group and a hydrosilyl group, these groups can undergo hydrosilylation reaction, in which a by-product is rarely produced, with the hydrosilyl group and the alkenyl group of the polymer (A), respectively. Therefore, such a compound is preferable.

The compound (B) further having a hydrophilic substituent, such as epoxy group, amino group and hydroxyl group, is preferable from the viewpoint of tack of the shaped product, and the compound (B) having a silsesquioxane skeleton or a polyhydric phenol skeleton is preferable from the viewpoint of heat resistance.

[Functional Filler (C)]

The functional filler (C) for use in the present invention is not specifically restricted, but examples thereof include fillers having functions such as thermal conduction, electrical conduction, magnetic property, dielectric property and gas barrier property. More specific examples thereof include graphite, diamond, aluminum, aluminum oxide (or alumina) [Al$_2$O$_3$], magnesium oxide, aluminum hydroxide, aluminum nitride [AlN], boron nitride [h-BN, c-BN], silica [SiO$_2$], silicon nitride [Si$_3$N$_4$], silicon carbide [SiC], mica, beryllium oxide [BeO], zinc oxide and zinc white. These can be used singly or in combination of two or more kinds.

The mean particle diameter of the functional filler (C) is not specifically restricted, but in the case of thermally conductive particles, it is preferably 0.2 to 500 µm, more preferably 0.5 to 100 µm. If the mean particle diameter is less than 0.5 µm, particularly less than 0.2 µm, homogeneous dispersing of the functional filler (C) in the composition containing the components (A) to (C) is liable to become bad. If the mean particle diameter exceeds 100 µm, particularly 500 µm, smoothness of the shaped product (e.g., sheet) is liable to be impaired. It is preferable to use two or more kinds of functional fillers different in mean particle diameter φ as the functional fillers (C) because a filling ratio of the functional filler (C) in the shaped product is improved.

In the case of a combination of fillers having two or more mean particle diameters, every particle contained has only to have the aforesaid mean particle diameter.

The shape of the functional filler (C) may be spherical or flat or may have any other shape, but from the viewpoint of a filling fraction of the shaped product, a spherical shape is preferable. When the shaped product is intended to be allowed to have anisotropy, it is preferable to use a flat filler.

From the viewpoints of maintenance of sheet-forming property and impartation of a functions such as thermal conduction property, the amount of the functional filler (C) blended is usually not less than 50 parts by weight but not more than 500 parts by weight, preferably not less than 300 parts by weight but not more than 500 parts by weight, based on 100 parts by weight of the total amount of the polymer (A) and the compound (B).

[Platinum-Based Catalyst (D)]

It is preferable to add a platinum-based catalyst (D), which becomes a catalyst, to the uncrosslinked composition used in the production of the shaped product of the present invention in the hydrosilylation reaction of the polymer (A) with the compound (B) from the viewpoint of acceleration of the reaction.

As such a platinum-based catalyst (D), for example, Speier catalyst ($H_2PtCl_6$) or Karstedt catalyst (prepared from $H_2PtCl_6$ and vinylsiloxane) can be used. Further, the same catalyst as a platinum group compound (C) described in patent literature JP-A 2001-72868 can be also used.

Examples of the platinum-based catalyst (D) include chloroplatinic acid, or a complex of chloroplatinic acid and an olefin such as ethylene, a complex of chloroplatinic acid and an alcohol or vinylsiloxane, and platinum compounds, such as platinum/silica or alumina or carbon. But it is not limited thereto. As platinum group compounds other than the platinum compounds, compounds of rhodium, ruthenium, iridium or palladium are also known, and examples include $RhCl(PPh_3)_3$, $RhCl(CO)(PPh_3)_2$, $RhCl(C_2H_4)_2$, $Ru_3(CO)_{12}$, $IrCl(CO)(PPh_3)_2$ and $Pd(PPh_3)$.

The amount of the platinum-based catalyst (D) added is not specifically restricted, but when uniformity of the reaction rate is taken into account, the platinum-based catalyst is desirably used in a catalytic amount, usually 0.0001 to 1.0 part by weight based on 100 parts by weight of the total amount of the polymer (A) and the compound (B).

[Fluorinated Oil (E)]

To the uncrosslinked composition that is prepared prior to the production of the shaped product of the present invention, a fluorinated oil (E) is preferably added as a plasticizer, because plasticity can be imparted to the shaped product, dispersibility of the components in the shaped product is enhanced, and formability, adhesion and tack of the shaped product are improved.

Examples of the fluorinated oil (E) include "Demnum" available from Daikin Kogyo Co., Ltd., "Flonlube" available from Asahi Glass Co., Ltd., "Fomblin" available from Ausimont, and "Krytox" available from DuPont, which are commercial products.

From the viewpoints of lowering of hardness and sheet-forming property, the amount of the fluorinated oil (E) added is usually not less than 2 parts by weight but not more than 30 parts by weight, preferably not less than 10 parts by weight but not more than 20 parts by weight, based on 100 parts by weight of the total amount of the polymer (A) and the compound (B).

[Silane Coupling Agent and/or Surface Active Agent (F)]

It is preferable to add a silane coupling agent and/or a surface active agent (F) to the uncrosslinked composition that is prepared prior to the production of the shaped product of the present invention, to carry out surface treatment of the functional filler (C). The surface treatment of the functional filler (C) improves bonding between the functional filler (C) and the silane coupling agent and/or the surface active agent (F) and bonding between the silane coupling agent and/or the surface active agent (F) and the polymer. Therefore, addition of such an agent is preferable from the viewpoint of improvement in dispersibility and filling property of the functional filler.

The types of the silane coupling agent and/or the surface active agent (F) are not specifically restricted, and examples of the silane coupling agents include vinyltrichlorosilane, vinyltriethoxysilane, methyltrimethoxysilane, trifluoropropyltrimethoxysilane, γ-glycidoxypropyltriethoxysilane and γ-mercaptopropyltrimethoxysilane. Examples of the surface active agents include sodium dodecylbenzenesulfonate, sodium alkylsulfate and polyoxyethylene alkyl ether.

From the viewpoints of thickness of a film on the functional filler (C) and maintenance of properties of the functional filler (C), the amount of the silane coupling agent and/or the surface active agent (F) added is usually not less than 0.1 part by weight but not more than 20 parts by weight, preferably not less than 0.2 part by weight but not more than 10 parts by weight, based on 100 parts by weight of the total amount of the polymer (A) and the compound (B).

Conventional treatment methods such as wet method, dry method and integral blending method can be applied to the surface treatment using the silane coupling agent and/or the surface active agent (F). Of these, wet method is preferably used from the viewpoint that a surface treatment film is uniformly prepared.

[Other Components]

The composition for producing the shaped product of the present invention may contain other components such as crosslinking accelerator, solvent, dispersing agent, anti-aging agent and pigment in addition to the components (A) to (F).

[Properties of Shaped Product]

The shaped product of the present invention preferably has a 10% compressive load of not more than 60 $N/cm^2$, more preferably not more than 40 $N/cm^2$, still more preferably not more than 30 $N/cm^2$, from the viewpoint of flexibility of a sheet. The lower limit of the 10% compressive load is about 1.0 $N/cm^2$. This 10% compressive load is determined by, for example, a method comprising applying a load to the shaped product by "AUTO GRAPA AG-500kND" manufactured by SHIMADZU Corporation and measuring a load value when the shaped product is compressed by 10%.

The change ratio of a 10% compressive load of the shaped product of the present invention after heating of the shaped product under the conditions of 200° C. and 72 hours to a 10% compressive load thereof before heating of the shaped product under the above conditions is preferably not more than 30%, more preferably not more than 15%. From the viewpoint of durability in the high-temperature use, it is preferable that the change ratio of the 10% compressive load before and after the high-temperature treatment is in the above range.

The change ratio is calculated from the following formula.

[(10% compressive load after heating)−(10% compressive load before heating)]/(10% compressive load before heating)×100

The tensile strength of the shaped product of the present invention, as measured in accordance with JIS K6251, is preferably not less than 1.0 MPa from the viewpoint of flexibility of a sheet. The tensile elongation is preferably not less than 50%, more preferably not less than 100%.

Considering adhesion to an object such as a heat generation member of a device for generating a large quantity of heat, such as a semiconductor part manufacturing device, and the like, the surface hardness (ASKER C hardness) of the shaped product of the present invention, as measured by an ASKER C hardness meter, is preferably not more than 60, more preferably not more than 50, still more preferably not more than 30.

Considering properties required for a thermally conductive sheet, etc, the thermal resistance value of the shaped product of the present invention, as measured by the method described in the working examples, is preferably not higher than 6.0° C./W, more preferably not higher than 5.5° C./W.

The weight decrease ratio of a weight of the shaped product of the present invention after heating of the shaped product under the conditions of 200° C. and 72 hours to a weight thereof before heating of the shaped product under the above conditions is preferably not more than 2.0%, more preferably not more than 1.4%. This weight decrease corresponds to the weight of components having bled (including emitted gas). The weight decrease ratio in the above range means rarely bleeding, and therefore, is preferable.

The weight decrease ratio is calculated from the following formula.

[(weight before heating)−(weight after heating)]/(weight before heating)×100

[Uses of Shaped Product]

The shaped product of the present invention has the above-described properties, and therefore, is preferable for a radiator sheet for a device generating a large quantity of heat, such as a semiconductor component manufacturing device, an electromagnetic wave shielding sheet, a flip chip, an electrode membrane, an electromagnetic wave absorber, a piezoelectric sensor, an antenna, an actuator, a gas barrier film, etc.

Production Process for Shaped Product

The production process for a shaped product of the present invention comprises a step (i) of preparing the uncrosslinked composition and a step (ii) of allowing the components (A) and (B) contained in the uncrosslinked composition to react with each other, and this process preferably further comprises a step (iii) of surface-treating the functional filler (C) in advance using the silane coupling agent and/or the surface active agent (F).

When the uncrosslinked composition is prepared in the step (i) by blending (A1) the polymer of a perfluoropolyether skeleton having one alkenyl group, (A2) the polymer of a perfluoropolyether skeleton having two hydrosilyl [SiH] groups, (B1) the compound having two alkenyl groups, and/or (B2) a compound having three hydrosilyl groups, (C) the functional filler, and preferably (D) the platinum-based catalyst, the weight ratio [(A1)+(A2):(B1)+(B2)] between the polymer (A) (the polymer (A1) and the polymer (A2)) and the compound (B) (the compound (B1) and/or the compound (B2)) is 98:2 to 50:50, and is preferably 95:5 to 75:25 from the viewpoints of flexibility and bleeding property, and the amount of the functional filler (C) is 50 to 500 parts by weight, and the amount of the platinum-based catalyst (D) is preferably 0.0001 to 1.0 part by weight based on 100 parts by weight of the total amount of the polymer (A) (polymer (A1) and polymer (A2)) and the compound (B) (compound (B1) and/or compound (B2)).

In the preparation of the uncrosslinked composition in the step (i), the uncrosslinked composition may be dissolved in an appropriate solvent such as metaxylene hexafluoride and Fluorinert so that a desired concentration may be obtained according to the use and the purpose of the resulting shaped product.

After the step (i), a reaction of the alkenyl group of the polymer (A) contained in the uncrosslinked composition with the hydrosilyl group of the compound (B2) contained therein and/or a reaction of the hydrosilyl group of the polymer (A2) with the alkenyl group of the compound (B1) is carried out as the step (ii), whereby the polymer (A1) and/or the polymer (A2) are crosslinked by the compound (B2) and/or the compound (B1), respectively, and the functional filler (C) is filled and dispersed in the crosslinked product.

The step (iii) is carried out before the functional filler (C) is added to the uncrosslinked composition in the step (i). The step (iii) is a step of subjecting the functional filler (C) in an amount of not less than 50 parts by weight but not more than 500 parts by weight to a wet treatment using the silane coupling agent and/or the surface active agent (F) in an amount of not less than 0.1 part by weight but not more than 20 parts by weight (that is, treatment of mixing the silane coupling agent and/or the surface active agent (F) with the functional filler (C) in water) to obtain a surface-treated functional filler (C').

When the step (iii) is carried out, the functional filler (C') obtained in the step (iii) is used instead of the functional filler (C) for use in the step (i).

The shape of the shaped product obtained by the production process of the present invention is preferably a sheet.

As a shaping technique into a sheet, an appropriate technique can be selected from compression molding, extrusion molding, injection molding, transfer molding, cast molding, blow molding, calendaring, etc. according the use and the purpose. When the uncrosslinked composition is liquid, an appropriate method can be selected from coating, printing, disperser method, potting, etc.

The production process for a shaped product of the present invention is not limited to the production process for a sheet. According to the production process for a shaped product of the present invention, shaped products other than a sheet can be also produced.

In blending of the components in the production process for a shaped product of the present invention, a mixing apparatus such as Ross mixer, planetary mixer, Hobart mixer, two-roll mill and three-roll mill is used, whereby the components can be homogeneously mixed.

EXAMPLES

Next, preferred embodiments of the present invention are described in more detail with reference to the following examples, but it should be construed that the present invention is in no way limited to those examples.

Main components used in the following examples, etc. are as follows.

Polymer (A)

"SIFEL (Registered Trademark) X71-8370" Available from Shin-Etsu Chemical Co. Ltd.

In this "SIFEL X71-8370", A liquid and B liquid are each independently included, and the A liquid comprises 0 to 40% by mol of a polymer of a perfluoropolyether skeleton having one alkenyl group at a molecular end and 60 to 100% by mol of a polymer of a perfluoropolyether skeleton having two alkenyl groups at molecular end(s), and the B liquid comprises 0 to 40% by mol of a polymer of a perfluoropolyether skeleton having one hydrosilyl group at a molecular end and 60 to 100% by mol of a polymer of a perfluoropolyether skeleton having two hydrosilyl groups at molecular end(s). Therefore, the A liquid was used as the polymer (A1), and the B liquid was used as the polymer (A2).

"SIFEL (Registered Trademark) X71-3405" Available from Shin-Etsu Chemical Co. Ltd.

In this "SIFEL X71-3405", A liquid and B liquid are each independently included, and the A liquid comprises 60 to 100% by mol of a polymer of a perfluoropolyether skeleton having one alkenyl group at a molecular end and 0 to 40% by mol of a polymer of a perfluoropolyether skeleton having two alkenyl groups at molecular end(s), and the B liquid comprises 60 to 100% by mol of a polymer of a perfluoropolyether skeleton having one hydrosilyl group at a molecular end and 0 to 40% by mol of a polymer of a perfluoropolyether skeleton having two hydrosilyl groups at molecular end(s). Therefore, the A liquid was used as the polymer (A1), and the B liquid was used as the polymer (A2).

To each of the B liquids of SIFEL, a platinum-based catalyst (D) has been already added.

Compound (B)

Liquid Silicone Rubber "KE-1950-10 (A•B)" Available from Shin-Etsu Chemical Co. Ltd.

In this "KE-1950-10", A liquid and B liquid are each independently contained, and their detailed chemical structures are as previously described. Here, the A liquid was used as the compound (B1), and the B liquid was used as the compound (B2).

Functional Filler (C)

"AA-18" Available from Sumitomo Chemical Co., Ltd. (Alumina Having Mean Particle Diameter of 18 μm)

This was used as the functional filler (C1).

"AA-3" Available from Sumitomo Chemical Co., Ltd. (Alumina Having Mean Particle Diameter of 3 μm)

This was used as the functional filler (C2).

Fluorinated Oil (C)

"Demnum S-200" Available from Daikin Kogyo Co., Ltd. (Perfluoropolyether Oil)

Silane-Coupling Agent and/or Surface Active Agent (F)

Silane Coupling Agent "KBM-7103" Available from Shin-Etsu Chemical Co. Ltd. (Trifluoropropyltrimethoxysilane)

Example 1

A thermally conductive sheet (shaped product) having an adhesive layer was produced in the following manner.

16.2 Parts by weight of the A liquid of "SIFEL X71-8370" and 37.8 parts by weight of the A liquid of "SIFEL X71-3405" (total: 54 parts by weight) as the polymers (A1), 10.8 parts by weight of the B liquid of "SIFEL X71-8370" and 25.2 parts by weight of the B liquid of "SIFEL X71-3405" (total: 36 parts by weight) as the polymers (A2), 10 parts by weight of the B liquid of "KE-1950-10" as the polymer (B2), 270 parts by weight of "AA-18" as the functional filler (C1), 30 parts by weight of "AA-3" as the functional filler (C2), 20 parts by weight of "Demnum S-200" as the fluorinated oil (E), and 3 parts by weight of "KBM-7103" as the silane coupling agent/surface active agent (F) were blended, and in order to sufficiently disperse the components, the blend was milled by a three-roll mill.

The resulting composition was shaped into a sheet having a prescribed thickness through compression molding under the conditions of a pressure of 480 N/cm$^2$, a temperature of 130° C. and a period of 15 minutes. The resulting sheet was placed in an electric furnace at 150° C. for 1 hour to obtain a sheet.

Various properties of the resulting shaped product were evaluated in accordance with the following methods. The evaluation results obtained are set forth in Table 1.

[10% Compressive Load]

To a sample prepared to have ϕ46.2 mm and a thickness of 0.1 mm, a load was applied by "AUTO GRAPA AG-500kND" manufactured by SHIMADZU Corporation, and a load value given when the sample was compressed by 10% was measured.

[Thermal Resistance]

To a heat-generating substrate, a sample (prepared to have a thickness of 1.0 mm, a length of 10 mm and a width of 10 mm) was allowed to adhere, then on the sample, a substrate (cooling substrate) made of the same material as that of the heat-generating substrate was placed, and they were subjected to pressure bonding under a given load (98 kPa). While monitoring the temperatures of parts of the both substrates where are in contact with the surface of the sample, the heat-generating substrate was heated with a calorific value of 45 W, and after 5 minutes, the above-mentioned temperatures of the both substrates, namely, a temperature of apart of the sample where is in contact with the heat-generating substrate (temperature of a heat-generating part: θj1) and a temperature of apart of the sample where is in contact with the cooling substrate (temperature of a cooling part: θj0), were measured. These measured values were applied to the following formula to calculate a thermal resistance.

Thermal resistance(° C./W)=(θj1−θj0)/calorific value Q

[Tensile Strength, Tensile Elongation]

In accordance with JIS K6251, a tensile strength (pulling strength) was determined from a force (maximum load) required for tensile break of a dumbbell (No. 2) specimen under application of a load at a given rate, and a tensile elongation was determined from an elongation given when the specimen was broken.

[Surface Hardness (ASKER C Hardness)]

Surface hardness was measured by an ASKER C hardness meter.

[Bleeding Test]

A sample prepared to have a size of 25 mm×25 mm×0.1 mm was heated at 200° C. for 72 hours in an electric furnace, and a decrease in weight between before and after the test was measured. The measured decrease in weight was taken as the amount of bleeding (including the amount of emitted gas).

Example 2

A thermally conductive sheet having an adhesive layer was produced in the same manner as in Example 1, except that the blending ratio was changed as shown in Table 1. Various properties of the resulting sheet were evaluated. The evaluation results are set forth in Table 1.

Comparative Example 1

A thermally conductive sheet having an adhesive layer was produced in the same manner as in Example 1, except that the amounts of the polymers (A1) and (A2) blended were each changed to 50% by weight and the compounds (B1) and (B2) were not blended. Various properties of the resulting sheet were evaluated. The evaluation results are set forth in Table 1.

Comparative Example 2

A thermally conductive sheet having an adhesive layer was produced in the same manner as in Example 1, except that the polymers (A1) and (A2) were not blended and the amounts of the compounds (B1) and (B2) blended were each changed to 50% by weight. Various properties of the resulting sheet were evaluated. The evaluation results are set forth in Table 1.

The invention claimed is:

1. A shaped product obtained by allowing a polymer (A) and a compound (B) to undergo hydrosilylation reaction, the polymer (A) and the compound (B) being contained in an uncrosslinked composition comprising the polymer (A), the compound (B) and a functional filler (C), wherein
   the polymer (A) is crosslinked by the compound (B), and the resulting crosslinked product is filled with the functional filler (C) dispersed therein,
   the polymer (A) comprises
   (A1) a polymer of a perfluoropolyether skeleton having one alkenyl group, and
   (A2) a polymer of a perfluoropolyether skeleton having two hydrosilyl [SiH] groups,
   the compound (B) comprises
   (B2) an organohydrogenpolysiloxane having three or more dihydrosilyls groups in one molecule, or
   (B1) a compound having two alkenyl groups, and the organohydrogenpolysiloxane (B2), and
   in the uncrosslinked composition,
   the content of the polymer (A) is 50 to 98 parts by weight based on 100 parts by weight of the total amount of the polymer (A) and the compound (B), and
   the content of the functional filler (C) is 50 to 500 parts by weight based on 100 parts by weight of the total amount of the polymer (A) and the compound (B).

2. The shaped product as claimed in claim 1, wherein the uncrosslinked composition further comprises, as the polymer (A),
   (A3) a polymer of a perfluoropolyether skeleton having two alkenyl groups, and
   (A4) a polymer of a perfluoropolyether skeleton having one hydrosilyl group, and further comprises, as the compound (B),
   (B3) a compound having three or more alkenyl groups, and/or
   (B4) a compound having four or more hydrosilyl groups.

3. The shaped product as claimed in claim 2, wherein the uncrosslinked composition further comprises (E) a fluorinated oil.

TABLE 1

| | | Examples | | Comparative Examples | |
|---|---|---|---|---|---|
| | (Parts by weight) | 1 | 2 | 1 | 2 |
| Composition of shaped product | Polymer (A1): "X-71-8370A" + "X-71-3405A" | 16.2 + 37.8 (=54) | 15 + 15 (=30) | 30 + 30 (=60) | — |
| | Polymer (A2): "X-71-8370B" + "X-71-3405B" | 10.8 + 25.2 (=36) | 10 + 10 (=20) | 20 + 20 (=40) | — |
| | Compound (B1): "KE-1950-10-A" | — | 25 | — | 50 |
| | Compound (B2): "KE-1950-10-B" | 10 | 25 | — | 50 |
| | Functional filler (C1): "AA-18" | 270 | 270 | 270 | 270 |
| | Functional filler (C2): "AA-3" | 30 | 30 | 30 | 30 |
| | Fluorine oil (E): "Demnum S-200" | 20 | 20 | 20 | 20 |
| | Silane coupling agent/surface active agent (F): "KBM-7103" | 3 | 3 | 3 | 3 |
| Properties of shaped product | 10% compressive load before heating (N/cm$^2$) | 12 | 55 | 37 | 62 |
| | 10% compressive load after heating (N/cm$^2$) | 13 | 61 | 35 | 89 |
| | Change ratio of 10% compressive load before and after heating (%) | 8.3 | 10.9 | −5.4 | 43.5 |
| | Thermal resistance (° C./W) | 5.5 | 6.0 | 6.4 | 5.2 |
| | Tensile strength (MPa) | 1.0 | 1.1 | 1.1 | 2.0 |
| | Tensile elongation (%) | 140 | 180 | 30 | 420 |
| | ASKER C hardness | 35 | 45 | 55 | 30 |
| | Bleeding weight decrease ratio (%) | 1.2 | 1.7 | 3.3 | 4.5 |

4. The shaped product as claimed in claim 2, wherein the uncrosslinked composition further comprises (D) a platinum-based catalyst and (F) a silane coupling agent and/or a surface active agent.

5. The shaped product as claimed in claim 2, having a 10% compressive load of not more than 60 N/cm² before heating under the conditions of 200° C. and 72 hours.

6. The shaped product as claimed in claim 1, wherein the uncrosslinked composition further comprises (E) a fluorinated oil.

7. The shaped product as claimed in claim 6, wherein the uncrosslinked composition further comprises (D) a platinum-based catalyst and (F) a silane coupling agent and/or a surface active agent.

8. The shaped product as claimed in claim 6, having a 10% compressive load of not more than 60 N/cm² before heating under the conditions of 200° C. and 72 hours.

9. The shaped product as claimed in claim 1, wherein the uncrosslinked composition further comprises (D) a platinum-based catalyst and (F) a silane coupling agent and/or a surface active agent.

10. The shaped product as claimed in claim 9, having a 10% compressive load of not more than 60 N/cm² before heating under the conditions of 200° C. and 72 hours.

11. The shaped product as claimed in claim 1, having a 10% compressive load of not more than 60 N/cm² before heating under the conditions of 200° C. and 72 hours.

12. The shaped product as claimed in claim 1, having a change ratio of a 10% compressive load of the shaped product after heating under conditions of 200° C. and 72 hours to a 10% compressive load thereof before the heating under the conditions is not more than 30%.

13. The shaped product as claimed in claim 1, having a thermal resistance value of not more than 6.0° C./W.

14. The shaped product as claimed in claim 1, having a tensile strength of not less than 1.0 MPa and a tensile elongation of not less than 50%.

15. The shaped product as claimed in claim 1, having a surface hardness (Asker C hardness) of not more than 60.

16. The shaped product as claimed in claim 1, wherein the weight decrease ratio of a weight of the shaped product after heating under conditions of 200° C. and 72 hours to a weight thereof before heating under the conditions is not more than 2.0%.

17. A production process for a shaped product, comprising:
a step of allowing a polymer (A), a compound (B) and a functional filler (C) to be contained to prepare an uncrosslinked composition, and
a step of allowing the polymer (A) and the compound (B) contained in the uncrosslinked composition to undergo hydrosilylation reaction and thereby crosslinking the polymer (A) by the compound (B) to fill the resulting crosslinked product with the functional filler (C) dispersed therein,
wherein:
the polymer (A) comprises
(A1) a polymer of a perfluoropolyether skeleton having one alkenyl group, and
(A2) a polymer of a perfluoropolyether skeleton having two hydrosilyl [SiH] groups,
the compound (B) comprises
(B2) an organohydrogenpolysiloxane having three or more dihydrosilyl groups in one molecule, or
(B1) a compound having two alkenyl groups, and the organohydrogenpolysiloxane (B2), and
in the preparation of the uncrosslinked composition,
the polymer (A) is contained in an amount of 50 to 98 parts by weight based on 100 parts by weight of the total amount of the polymer (A) and the compound (B), and
the functional filler (C) is contained in an amount of 50 to 500 parts by weight based on 100 parts by weight of the total amount of the polymer (A) and the compound (B).

18. The production process for a shaped product as claimed in claim 17, wherein the uncrosslinked composition further comprises, as the polymer (A),
(A3) a polymer of a perfluoropolyether skeleton having two alkenyl groups, and
(A4) a polymer of a perfluoropolyether skeleton having one hydrosilyl group, and further comprises, as the compound (B),
(B3) a compound having three or more alkenyl groups, and/or
(B4) a compound having four or more hydrosilyl groups.

19. The production process for a shaped product as claimed in claim 17, wherein the uncrosslinked composition further comprises (D) a platinum-based catalyst and (E) a fluorinated oil.

20. The production process for a shaped product as claimed in claim 17, wherein the uncrosslinked composition further comprises (F) a silane coupling agent and/or a surface active agent, and
the production process further comprises, before the preparation step for the uncrosslinked composition, a step of surface-treating the functional filler (C) in advance using (F) the silane coupling agent and/or the surface active agent.

* * * * *

UNITED STATES PATENT AND TRADEMARK OFFICE
CERTIFICATE OF CORRECTION

PATENT NO.       : 9,441,107 B2  
APPLICATION NO.  : 14/424278  
DATED            : September 13, 2016  
INVENTOR(S)      : Hirohisa Imada et al.

Page 1 of 1

It is certified that error appears in the above-identified patent and that said Letters Patent is hereby corrected as shown below:

In the claims,  
Column 28, Line 18, Claim 1, delete "dihydrosilyls" and insert -- dihydrosilyl --

Signed and Sealed this  
Fifteenth Day of November, 2016

Michelle K. Lee  
*Director of the United States Patent and Trademark Office*